US012580842B1

(12) United States Patent
Montgomery et al.

(10) Patent No.: US 12,580,842 B1
(45) Date of Patent: *\*Mar. 17, 2026*

(54) IDENTIFYING A MAXIMUM SEGMENT SIZE (MSS) CORRESPONDING TO A NETWORK PATH

(71) Applicant: Juniper Networks, Inc., Sunnyvale, CA (US)

(72) Inventors: Dennis Gordon Montgomery, Burlington, MA (US); Anna Yungelson, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,803

(22) Filed: Dec. 5, 2023

Related U.S. Application Data

(63) Continuation of application No. 17/446,568, filed on Aug. 31, 2021, now Pat. No. 11,902,146.

(51) Int. Cl.
H04W 28/02 (2009.01)
H04L 9/32 (2006.01)
(Continued)

(52) U.S. Cl.
CPC .......... H04L 45/122 (2013.01); H04L 9/3242 (2013.01); H04L 45/126 (2013.01);
(Continued)

(58) Field of Classification Search
CPC ....... H04L 47/01; H04L 47/36; H04L 47/365; H04L 1/0061; H04L 45/586; H04L 47/18;
(Continued)

(56) References Cited

U.S. PATENT DOCUMENTS

| | | |
|---|---|---|
| 7,374,535 B2 | 5/2008 | Schoenberg et al. |
| 9,729,439 B2 | 8/2017 | MeLampy et al. |

(Continued)

OTHER PUBLICATIONS

"Configuring TCP MSS Adjustment" IP Configuration Guide, Cisco IOS XE Fuji 16.9.x (Catalyst 3650 Switches) Cisco, Aug. 5, 2019, 4 pp.

(Continued)

*Primary Examiner* — Nicholas R Taylor
*Assistant Examiner* — Ho T Shiu
(74) *Attorney, Agent, or Firm* — Shumaker & Sieffert, P.A.

(57) ABSTRACT

Techniques are disclosed for identifying a maximum segment size (MSS) for a path. For example, a first router includes a routing engine and a packet forwarding engine. The routing engine is configured to identify a path maximum transmission unit (MTU) corresponding to a path between the first router and a second router; and identify a maximum packet overhead size corresponding to a session between a first client device and a second client device over the path between the first router and the second router. Additionally, the routing engine is configured to calculate, based on the path MTU and the maximum packet overhead size, a path maximum segment size (MSS), wherein the path MSS represents a maximum packet payload size corresponding to the path; and control the packet forwarding engine to output information indicative of the path MSS.

20 Claims, 5 Drawing Sheets

(51) Int. Cl.

| | |
|---|---|
| *H04L 45/00* | (2022.01) |
| *H04L 45/12* | (2022.01) |
| *H04L 45/122* | (2022.01) |
| *H04L 45/24* | (2022.01) |
| *H04L 45/745* | (2022.01) |
| *H04L 47/36* | (2022.01) |

(52) U.S. Cl.
CPC .............. *H04L 45/22* (2013.01); *H04L 45/24* (2013.01); *H04L 45/745* (2013.01)

(58) Field of Classification Search
CPC ................. H04L 47/193; H04L 47/165; G06F 2009/45595; G06F 9/45558
See application file for complete search history.

(56) References Cited

U.S. PATENT DOCUMENTS

| | | | | |
|---|---|---|---|---|
| 9,729,682 | B2 | 8/2017 | Kumar et al. | |
| 9,762,485 | B2 | 9/2017 | Kaplan et al. | |
| 9,871,748 | B2 | 1/2018 | Gosselin et al. | |
| 9,985,883 | B2 | 5/2018 | MeLampy et al. | |
| 10,200,264 | B2 | 2/2019 | Menon et al. | |
| 10,277,506 | B2 | 4/2019 | Timmons et al. | |
| 10,432,522 | B2 | 10/2019 | Kaplan et al. | |
| 11,005,761 | B1 | 5/2021 | Williams et al. | |
| 11,032,176 | B2 | 6/2021 | Jain et al. | |
| 11,032,248 | B2 | 6/2021 | Kumar et al. | |
| 2005/0232161 | A1* | 10/2005 | Maufer | H04L 9/0844 370/252 |
| 2006/0018315 | A1* | 1/2006 | Baratakke | H04L 69/16 370/389 |
| 2008/0107026 | A1* | 5/2008 | Backman | H04L 47/36 370/235 |
| 2010/0322249 | A1 | 12/2010 | Thathapudi et al. | |
| 2011/0044241 | A1 | 2/2011 | Hapsari | |
| 2012/0281559 | A1* | 11/2012 | Ner | H04W 28/06 370/252 |
| 2014/0003424 | A1* | 1/2014 | Matsuhira | H04L 47/10 370/389 |
| 2020/0366589 | A1 | 11/2020 | Kaplan et al. | |
| 2020/0366590 | A1 | 11/2020 | Kaplan et al. | |
| 2020/0366598 | A1 | 11/2020 | Kaplan et al. | |
| 2020/0366599 | A1 | 11/2020 | Kaplan et al. | |
| 2020/0403890 | A1 | 12/2020 | McCulley et al. | |
| 2021/0099532 | A1 | 4/2021 | Goel et al. | |

OTHER PUBLICATIONS

"Fragmentation considerations" IBM Documentation, IBM Corporation, 2014 (Applicant points out, in accordance with MPEP 609.04(a), that the year of publication, 2014, is sufficiently earlier than the effective U.S. filing date, so that the particular month of publication is not in issue.), 3 pp.

"How to determine the optimal MTU and MSS size" Peplink Community, Jan. 6, 2017, 4 pp.

"IP Services: Use the new maximum segment size adjustments if required" z/OS/2.3.0, IBM Corporation, 2015 (Applicant points out, in accordance with MPEP 609.04(a), that the year of publication, 2015, is sufficiently earlier than the effective U.S. filing date, so that the particular month of publication is not in issue.), 2 pp.

"TCP Maximum Segment Size tuning" IBM Documentation, AIX /7.1, IBM Corporation, 2020, 3 pp.

"Transmission Control Protocol," RFC 793, DARPA Internet Program, Protocol Specification, Sep. 1981, 91 pp.

"Understanding TCP MSS Clamping" VMWare, Inc., Oct. 23, 2020, 3 pp.

Dierks et al., "The Transport Layer Security (TLS) Protocol Version 1.2," Network Working Group, RFC 5246, Aug. 2008, 104 pp.

Mogul et al., "Path MTU Discovery," Network Working Group, RFC 1191, Nov. 1990, 19 pp.

Postel "User Datagram Protocol," Network Working Group, Internet Engineering Task Force, RFC 768, Aug. 28, 1980, 3 pp.

Postel, "Internet Control Message Protocol—DARPA Internet Program Protocol Specification," RFC 792, Information Sciences Institute, Network Working Group, Sep. 1981, 21 pp.

Prosecution History from U.S. Appl. No. 17/446,568, dated Aug. 8, 2022 through Jan. 9, 2024, 119 pp.

Rescorla, "The Transport Layer Security (TLS) Protocol Version 1.3," Internet Engineering Task Force (IETF), RFC 8446, Aug. 2018, 160 pp.

U.S. Appl. No. 16/050,722, filed Jul. 31, 2018 entitled Network Neighborhoods for Establishing Communication Relationships Between Communication Interfaces in an Administrative Domain, Juniper Networks, Inc. (inventor: Timmons et al.).

U.S. Appl. No. 17/446,568, filed Aug. 31, 2021, naming inventors Montgomery et al.

* cited by examiner

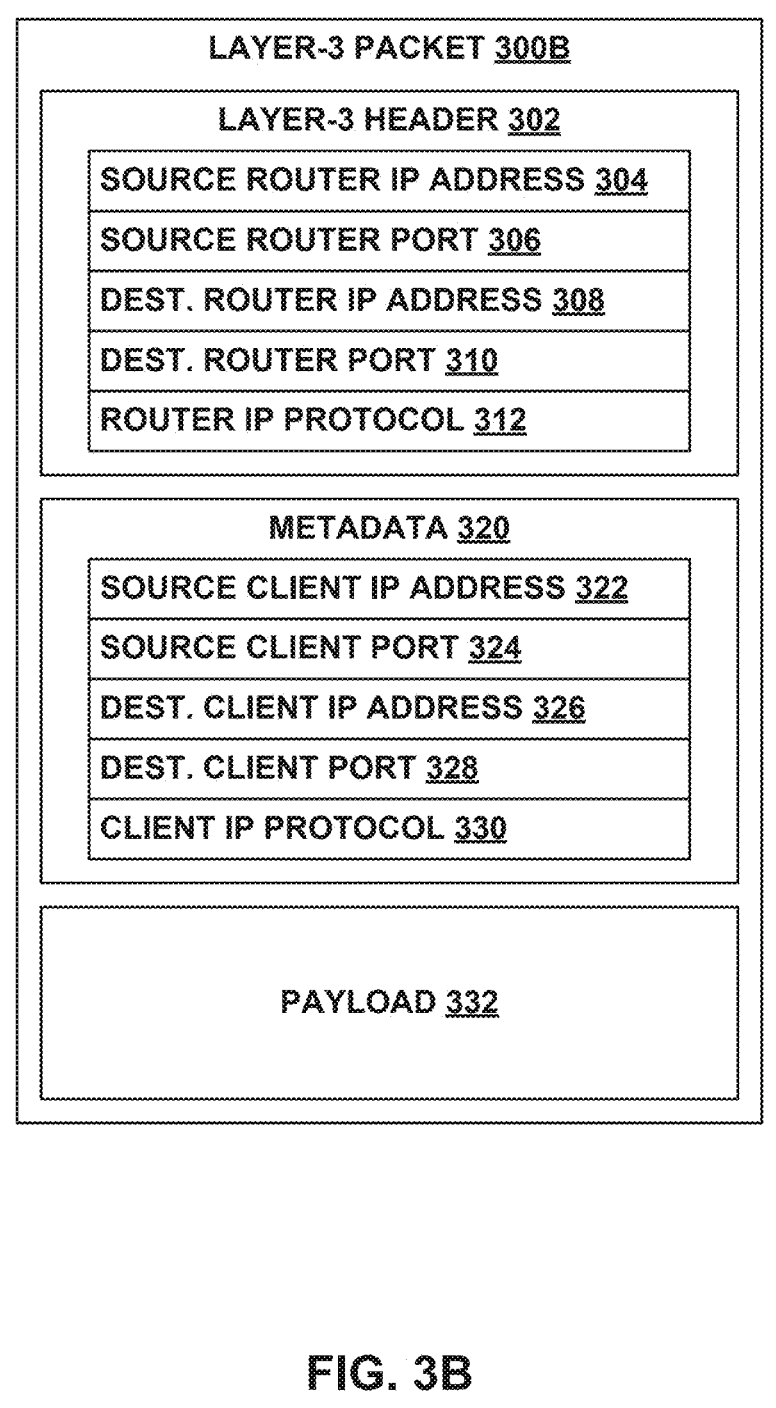

LAYER-3 PACKET 300B

LAYER-3 HEADER 302

SOURCE ROUTER IP ADDRESS 304

SOURCE ROUTER PORT 306

DEST. ROUTER IP ADDRESS 308

DEST. ROUTER PORT 310

ROUTER IP PROTOCOL 312

METADATA 320

SOURCE CLIENT IP ADDRESS 322

SOURCE CLIENT PORT 324

DEST. CLIENT IP ADDRESS 326

DEST. CLIENT PORT 328

CLIENT IP PROTOCOL 330

PAYLOAD 332

FIG. 3B

IDENTIFYING A MAXIMUM SEGMENT SIZE (MSS) CORRESPONDING TO A NETWORK PATH

This application is a continuation of U.S. patent application Ser. No. 17/446,568, filed on Aug. 31, 2021, the entire content of which is incorporated herein by reference.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

In general, the disclosure describes one or more techniques for identifying a maximum segment size (MSS) corresponding to one or more packets traversing a path between client devices within a network. For example, a set of routers may connect a first client device and a second client device. The set of routers may form a path along the routers that carry packets between the first client device and the second client device. In some examples, one or more packets traveling from the first client device and the second client device may each traverse the set of routers according to the same path through the set of routers. It may be beneficial for a payload of a packet traveling between the first client device and the second client device to include the largest possible amount of data that does not cause the packet to exceed a maximum transmission unit (MTU) for the path. By not exceeding the MTU for the path, routers may avoid segmenting (otherwise referred to as packet fragmentation) the packet when traveling over the path.

For example, a path MTU represents a largest amount of data of a packet (e.g., size of largest protocol data unit (PDU)) that can be communicated through the path from a source to a destination. When a packet size does not exceed the path MTU, then the packet may travel the entire path without segmentation. Conversely, when a packet size exceeds the MTU for a path between a first client device and a second client device, the packet is segmented into smaller packet sizes to enable the packet to travel from the first client device to the second client device. Packet segmentation increases the number of packets and an amount of time that it takes for a path to deliver a packet to a client device. Consequently, it may be beneficial for the techniques described herein to prevent packet segmentation by ensuring that packets do not exceed the MTU for a given path. One way to ensure that packets do not exceed the MTU for a given path is to identify and adjust a path maximum segment size (MSS). A path MSS may represent a largest amount of data of a packet payload that can be communicated in a single session (e.g., TCP session) while allowing the packet to traverse the path without segmentation.

In accordance with the techniques described in this disclosure, a network device, e.g., router, may determine a maximum segment size (MSS) corresponding to a session based on a maximum transmission unit (MTU) for the session and a maximum packet overhead size for the session, and provide information indicative of the path MSS to a client device to cause the client device to limit packets to having payloads that do not exceed the path MSS. For example, a first router may receive a first packet from a first client device, where the first packet includes information indicative of a request to establish a session between the first client device a second client device. The first router may forward the first packet to the second client device via the path comprising a set of routers, where the set of routers comprises the first router. The first router may determine a path MTU for the session and maximum packet overhead size corresponding to the path. For example, to forward a packet between the first router and the second router, the packet may include an IP header and TCP header, and in some instances encryption information to secure the session. As such, the maximum packet overhead size is based on the size of the headers to forward the packet between the first router and the second router. The first router may determine a path MSS, for example, by computing the difference between the path MTU and the maximum packet overhead size corresponding to the path. Subsequently, the router may inject information indicative of the path MSS into a second packet received from the second client device (e.g., SYN-ACK packet). The first router may forward the second packet to the first client device, causing the first client device to limit packets to having payloads that do not exceed the path MSS.

The techniques of the disclosure may provide specific improvements to the computer-related field of computer networking that have practical applications. For example, by identifying the path MSS based on the path MTU and maximum packet overhead size on the router and injecting the path MSS into a packet to a client device, the client device may limit packets to having payloads that do not cause the packet to exceed a maximum transmission unit (MTU) for the path without needing to statically and manually adjusting the MTU on the client device's network interface.

In some examples, a first router includes a routing engine and a packet forwarding engine. The routing engine is configured to identify a path maximum transmission unit (MTU) corresponding to a path between the first router and a second router, wherein the path represents a route from the first router to the second router through a set of routers including the first router and the second router; and identify a maximum packet overhead size corresponding to a session between a first client device and a second client device over the path between the first router and the second router. Additionally, the first router may calculate, based on the path MTU and the maximum packet overhead size, a path maximum segment size (MSS), wherein the path MSS represents a maximum packet payload size corresponding to the path; and control the packet forwarding engine to output information indicative of the path MSS.

In some examples, a method includes identifying, by a routing engine of a first router, a path maximum transmission unit (MTU) corresponding to a path between the first router and a second router, wherein the path represents a route from the first router to the second router through a set of routers including the first router and the second router; and identifying, by the routing engine, a maximum packet overhead size corresponding to a session between a first client device and a second client device over the path between the first router and the second router. Additionally, the method includes calculating, by the routing engine based on the path MTU and the maximum packet overhead size, a path maximum segment size (MSS), wherein the path MSS represents a maximum packet payload size corresponding to the path; and controlling, by the routing engine, a packet forwarding engine of the first router to output information indicative of the path MSS.

In some examples, a computer-readable medium includes instructions that, when executed by a processor, cause the processor to identify a path maximum transmission unit (MTU) corresponding to a path between a first router and a second router, wherein the path represents a route from the first router to the second router through a set of routers including the first router and the second router; and identify a maximum packet overhead size corresponding to a session between a first client device and a second client device over the path between the first router and the second router. Additionally, the instructions cause the processor to calculate, based on the path MTU and the maximum packet overhead size, a path maximum segment size (MSS), wherein the path MSS represents a maximum packet payload size corresponding to the path; and control a packet forwarding engine of the first router to output information indicative of the path MSS.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3B is a block diagram illustrating a data structure for an L3 packet generated from the L2 frame of FIG. 3A, in accordance with one or more techniques of this disclosure.

Like reference characters refer to like elements throughout the figures and description.

DETAILED DESCRIPTION

Figure 1:
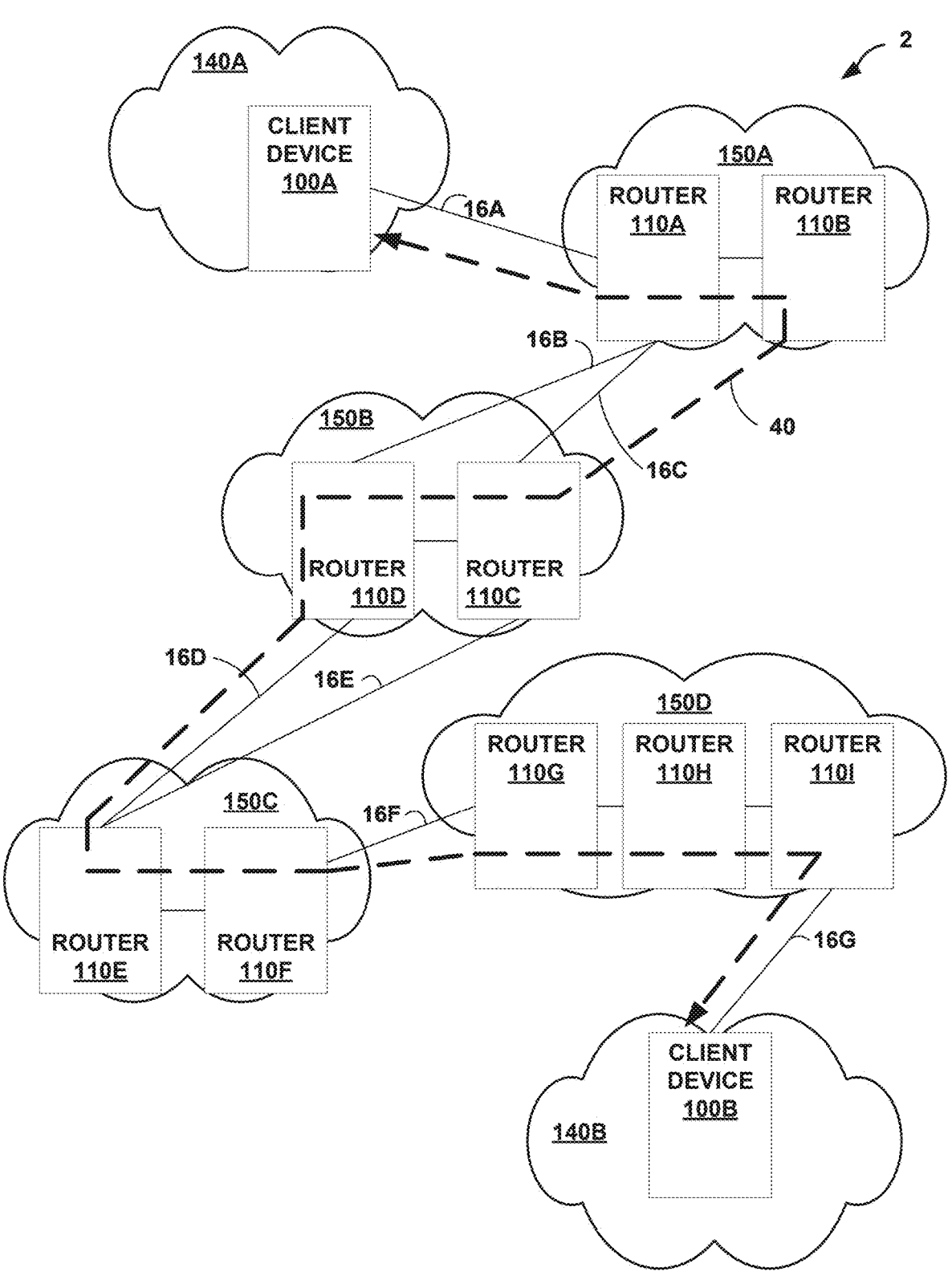
FIG. 1 is a block diagram illustrating an example computer network system, in accordance with one or more techniques of this disclosure.

FIG. 1 is a block diagram illustrating an example computer network system 2, in accordance with one or more techniques of this disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100B (collectively, "client devices 100") associated with customer networks 140 with access to service provider networks 150. In some examples, customer networks 140 are enterprise networks. Customer network 140A is depicted as having a single client device 100A and customer network 140B is depicted as having a single client device 100B for ease of illustration, but each of customer networks 140 may include any number of client devices.

As depicted in the example of FIG. 1, customer networks 140 are L2 computer networks, where reference to a layer followed by a number refers to a corresponding layer in the Open Systems Interconnection (OSI) model. L2 is also known as a "data link layer" in the OSI model and the term L2 may be used interchangeably with the phrase "data link layer" throughout this disclosure. Typically, customer networks 140 include many client devices 100, each of which may communicate across service provider networks 150 with one another as described in more detail below. Communication links 16A-16G (collectively, links "16") may be Ethernet, ATM or any other suitable network connections.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG.

1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100A of system 2 establishes session 40 with client device 100B. Routers 110 facilitate establishment of session 40 by transporting net-work traffic between client device 100A and client device 100B. In some examples, client device 100A may be considered a "source" device in that client device 100A originates session 40 between client device 100A and client device 100B, e.g., client device 100A is the "source" of a packet of a forward flow of the session. Session 40 includes a forward packet flow originating from client device 100A and destined for client device 100B and a reverse packet flow originating from client device 100B and destined for client device 100A. A forward flow for session 40 traverses a first path including, e.g., client device 100A, routers 110A-110I, and client device 100B. As described in more detail below, routers 110 enable the extension of customer network 140A, an L2 network, across service provider networks 150, e.g., L3 networks, to customer network 140B, another L2 network.

Client device 100A may establish session 40 with client device 100B according to one or more L2 communication session protocols including TCP, TLS, UDP, or ICMP, etc. For example, to establish session 40 according to TCP such that data may be exchanged according to TCP, client device 100A and client device 100B perform a three-way handshake. Client device 100A sends a first packet comprising a "SYN" flag to client device 100B. Client device 100B acknowledges receipt of the first packet by responding to client device 100A with a second packet comprising a "SYN-ACK" flag. Client device 100A acknowledges receipt of the second packet by responding to client device 100B with a third packet comprising an "ACK" flag. After sending the third packet, session 40 is established according to TCP and client devices 100A, 100B may exchange data with one another (e.g., by transporting L2 data between client device 100A and client device 100B) via session 40. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

UDP is a connectionless protocol in that client device 100A does not verify that client device 100B is capable of receiving data prior to transmitting data. To establish session 40 according to UDP, client device 100A transmits a first packet to client device 100B. Session 40 may be considered "established" according to UDP upon receipt by client device 100A of any packet from client device 100B, which implies that client device 100B successfully received the first packet from client device 100A, responded, and client device 100A was able to receive the response from client device 100B. Additional example information regarding UDP is described in "User Datagram Protocol," RFC 768, IETF, Aug. 28, 1980, available at https://tools.ietf.org/html/rfc768, the entire contents of which are incorporated herein by reference.

To establish session 40 according to TLS session, client device 100A and client device 100B perform a TLS handshake to establish a secure connection in place before transferring data. The TLS handshake occurs in three phases: a key exchange phase, a server parameters phase, and an authentication phase. In the key exchange phase, client device 100A sends a ClientHello message that includes cipher and key information. Client device 100B responds with a ServerHello message, which indicates negotiated connection parameters. The combination of the ClientHello and the ServerHello determines the shared keys. During the server parameters phase, client device 100B sends an EncryptedExtensions message followed by a CertificateRequest message to establish the server parameters. Finally, during the authentication phase, client device 100A and client device 100B exchange authentication messages. Specifically, client device 100B sends an optional Certificate message, a Certificate Verify message, and a Finished message. Upon receiving the messages from client device 100B, client device 100A responds with its Authentication messages, e.g., a Certificate message, a Certificate Verify message (if requested), and a Finished message. After client device 100A transmits the Finished message, the handshake is complete, and client device 100A and client device 100B may exchange data with one another via session 40 according to TLS. Additional example information regarding TLS is described in "The Transport Layer Security (TLS) Protocol Version 1.2," RFC 5246, IETF, August 2008; and "The Transport Layer Security (TLS) Protocol Version 1.3," RFC 8446 August 2018, the entire contents of each of which are incorporated herein by reference.

ICMP is a control protocol, unlike TCP, TLS, or UDP, which are transport protocols. An ICMP packet does not carry application data, but instead is used for diagnostic, control, or error messages. Like UDP, ICMP is a connectionless protocol in that client device 100A does not verify that client device 100B is capable of receiving data prior to transmitting an ICMP message. To establish session 40 according to ICMP, client device 100A transmits a first packet to client device 100B. Session 40 may be considered "established" according to ICMP upon receipt by client device 100A of any packet from client device 100B, which implies that client device 100B successfully received the first packet from client device 100A, responded, and client device 100A was able to receive the response from client device 100B. Additional example information regarding ICMP is described in "INTERNET CONTROL MESSAGE PROTOCOL," RFC 792, IETF, September 1981, the entire contents of which are incorporated herein by reference.

In the example of FIG. 1, when router 110A receives a packet for the forward packet flow originating from client device 100A and destined for client device 100B, router 110A determines whether the packet belongs to a new session (e.g., is the "first" packet or "lead" packet of session 40). In some examples, router 110A determines whether a source address, source port, destination address, destination port, and protocol of the first packet matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 100B, and a protocol used by the first packet. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI).

In the example of FIG. 1, a stateful routing session may be established from ingress router 110A through intermediate routers 110B-110H to egress router 110I. In this example, router 110A determines that the first packet is an unmodified packet and the first packet of new session 40. Router 110A modifies the first packet to include metadata specifying the session identifier (e.g., the original source address, source port, destination address, and destination port). Router 110A replaces the header of the modified first packet to specify a source address that is an address of router 110A, a source port that is a port via which router 110A forwards the modified first packet toward client device 100B, a destination address that is an address of the next hop to which router 110A forwards the first packet (e.g., an address of router 110B), and a destination port that is a port of the next hop to which router 110A forwards the first packet (e.g., a port of router 110B).

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 100B. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 100B. In this fashion, router 110A may perform service-specific path selection to select a network path that best suits the requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110B. Additionally, router 110A stores the session identifier for session 40 such that, upon receiving subsequent packets for session 40, router 110A may identify the subsequent packets as belonging to the same session 40 and forward the subsequent packets along the same path as the first packet.

Intermediate router 110B receives the modified first packet and determines whether the modified first packet includes metadata specifying the session identifier. In response to determining that the modified first packet includes metadata specifying the session identifier, intermediate router 110B determines that router 110B is not an ingress device such that router 110B does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 100B, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100.

A router 110 that may forward packets for a forward packet flow of the session to a destination for the packet flow is an egress, or "terminus" router. In the foregoing example, router 110I is a terminus router because router 110I may forward packets to client device 100B. Router 110I receives the modified first packet that comprises the metadata specifying the session identifier (e.g., the original source address, source port, destination address, and destination port). Router 110I identifies the modified first packet as destined for a service terminating at router 110I by determining that the destination source address and destination source port specified in the metadata of the modified lead packet corresponds to a destination reachable by router 110I (e.g., client device 100B). Router 110I recovers the original first packet by removing the metadata from the modified first packet and using the metadata to modify the header of the first packet to specify the original source address, source port, destination address, and destination port. Router 110I forwards the recovered first packet to client device 100B. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to a central repository, e.g., a server. Further, each router 110 may receive service and topology state information for each other router 110 in system 2 from the central repository.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, each service provider network 150 may be considered to be a different "district," wherein each subdomain within each service provider network 150 may be considered to be a neighborhood within that district. In this example, each router 110A and 110B within service provider network 150A may maintain service and topology state information only for one another, and not for routers 110C-110I. Similarly, each router 110D and 110C within service provider network 150B may maintain service and topology state information only for one another, and not for routers 110A-110B or 110E-110I. In other examples, an administrator may assign one or more service provider networks 150 into one or more districts, one or more neighborhoods, or a combination of districts and neighborhoods as suits the needs of network system 2.

Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

Identifying Path MSS for a Session

In accordance with the techniques of the disclosure, a router may determine a maximum segment size (MSS) corresponding to a session based on a maximum transmission unit (MTU) for the session and a maximum packet overhead size for the session. The MTU represents a maximum amount of data that a packet can include and traverse a path of the session without segmentation. The MTU represents a maximum amount of data that a packet can include and traverse a path of the session without segmentation. For example, when a packet exceeds the path MTU for session 40, the packet is segmented into two or more smaller packets (otherwise referred to as "IP fragmentation") when traveling between client device 100A and client device 100B. When a packet does not exceed the path MTU for session 40, then the packet may traverse the entire path between client device 100A and client device 100B without segmentation. In some cases, packet segmentation can be inefficient because devices that segment packets must consume computing resources that could be used for other tasks in examples where the devices are not required to segment packets. Moreover, when a device is forced to break a packet into two or more smaller packets, more packets are sent to deliver data to a client device.

Routers 110 may be configured to provide information to client devices 100 that cause client devices 100 to limit packet sizes to the path MTU for session 40. For example, any of routers 110 may be configured to determine a path MSS corresponding to session 40, and output information indicative of the path MSS to client devices 100. When client devices 100 obtain the information indicative of the path MSS, then client devices 100 may control a size of packet payloads for transmission over the path so that the packet payloads do not exceed the path MSS for session 40, and thus do not exceed the path MTU. By providing the path MSS to client devices 100, the router may prevent client devices 100 from sending packets that are too large to traverse the path between client device 100A and client device 100B. Consequently, the router may prevent routers 110 from having to segment packets. By providing the path MSS to client devices 100, client devices 100 may control packet payloads, based on the path MSS received from the router, to have the largest amount of data possible while still allowing the packets to traverse the path without segmentation, and without needing to manually and statically set the MTU of a client device's network interface.

As one example, client device 100A initiates an establishment of session 40 by sending a first packet to router 110A. Routers 110 may facilitate establishment of session 40 by forming a path between client device 100A and client device 100B via routers 110. As seen in FIG. 1, the path from client device 100A to client device 100B includes router 110A, router 110B, router 110C, router 110D, router 110E, router 110F, router 110G, router 110H, and router 110I, in that order. Techniques described herein are not meant to be limited to the configuration of FIG. 1. A path may include any number, arrangement, or order of routers. Since router 110A is the first router in the path from client device 100A to client device 100B, router 110A may represent an "ingress" router of routers 110. Client device 100A and client device 100B may send one or more packets to establish session 40 using communication session protocols (e.g., TCP).

In this example, router 110A may determine a path MSS for session 40. Router 110A may determine the path MSS when routers 110 are establishing session 40, or at any time before, during, or after the establishment of session 40. Router 110A may receive the first packet from client device 100A, the first packet including a request to establish session 40 between client device 100A and client device 100B. Router 110A may identify a path MTU for session 40. For example, router 110A may perform path MTU discovery to determine a maximum size of a packet that can traverse the path between client device 100A to client device 100B without segmentation. In some examples, routers 110 may select a minimum of the MTU of the ingress interface and the MTU of the egress interface. For example, router 110A may include an ingress MTU corresponding to an ingress interface of router 110A that is the interface between router 110A and client device 100A, and an egress MTU corresponding to an egress interface of router 110A that is the interface between router 110A and router 110B. Router 110A may send a path MTU discovery message out of each interface to determine the MTU of the interfaces, respectively. Router 110A may select a minimum of the ingress MTU and the egress MTU in order to determine the path MTU for the path between client device 100A and client device 100B. Additional examples of the path MTU discovery is further described in J. Mogul, et al., "Path MTU Discovery," Request for Comments 1191 November 1990, the entire contents of which is incorporated by reference herein.

In some examples, router 110A may store the path MTU in a path MTU database stored by router 110A or another device. The path MTU database may include a plurality of path MTUs including the path MTU for the path of session 40. Each path MTU of the plurality of path MTUs may correspond to a respective path through one or more routers.

Router 110A may identify a maximum packet overhead size corresponding to session 40. The maximum packet overhead size corresponding to session 40 may represent a size of the largest packet overhead required to forward a packet over the path between client device 100A and client device 100B. For example, when routers 110 forward IP packets between client device 100A and client device 100B according to TCP, each packet may include a TCP header and an internet protocol (IP) header. The TCP header may include information for forwarding the packet on a TCP session, such as a source port, destination port, sequence number, acknowledgement number, header length, window size, checksum, urgent pointer. The IP header may include information for forwarding an IP packet, such as source IP address, destination IP address, protocol, and other information such as version (IPv4 or IPV6), header length, type of service, total length of the packet, identification, fragment offset, time-to-live, header checksum, etc. In some examples, routers 110 may attach encryption data (e.g., encryption expansion and Hash-based message authentication code (HMAC) appending) to each packet in order to secure the path through routers 110. Consequently, the overhead of packets traveling through routers 110 may require a larger overhead than one or more packets that do not travel through routers 110 (e.g., between router 110A and client device 100A). In any case, router 110A may determine a size of the maximum packet overhead for routing a packet between client device 100A and 100B.

In some examples, the size of a TCP header is 20 bytes, and a size of an IP header is 20 bytes. The security overhead may include up to 16 bytes for a payload expansion for encryption, and 32 bytes for a hash-based message authentication code (HMAC) digest. Consequently, in one example, the maximum packet overhead size corresponding to session 40 is 88 bytes, but this is not required. The maximum packet overhead size corresponding to session 40 may include any packet overhead size that represents the maximum overhead for forwarding a packet through a path. For example, for a non-secure session, the maximum packet overhead size corresponding to session 40 is 40 bytes (e.g., size of TCP header and IP header). In other examples, the packet may include other information to increase the packet overhead size.

Router 110A may calculate, based on the path MTU for session 40 and the maximum packet overhead size for session 40, a path MSS for session 40. In some examples, to calculate the path MSS, router 110A may determine a difference between the maximum packet overhead size and the path MTU. For example, router 110A may subtract the maximum packet overhead size from the path MTU. For example, if the path MTU for session 40 is determined to be 1500 bytes and the maximum packet overhead size is 88 bytes, the path MSS is 1412 bytes. Since the path MTU represents a maximum size of a packet configured to traverse the path of session 40 without segmentation, the MSS calculated by router 110A may represent a maximum packet payload size for a packet traversing the path of session 40 without segmentation. Given that the packet overhead to forward packets for session 40 may be required to be the same size, the path MSS may be adjusted without causing the packet to exceed the path MTU.

In examples where router 110A calculates the MSS in response to receiving the first packet including a request to establish session 40, router 110A may insert information indicative of the MSS into the first packet. In some examples, the first packet may include information indicative of an MSS when router 110A receives the first packet. Router 110A may forward the first packet (e.g., SYN packet in TCP) to router 110B, the first packet including the information indicative of the path MSS for session 40. Router 110B may forward the packet to router 110C, router 110C may forward the packet to router 110D, and so on. Client device 100B may receive the first packet having traversed the entire path through routers 110. Consequently, client device 100B may receive the first packet including the information indicative of the path MSS for session 40. In turn, client device 100B may control a payload size of one or more packets that client device 100B forwards through the path of session 40 so that the payload size is less than or equal to the path MSS.

In some examples, client device 100B forwards a second packet (e.g., SYN-ACK packet in TCP) to router 110I in response to receiving the first packet from router 110I. Router 110I may forward the second packet to router 110H, router 110H may forward the second packet to router 110G, and so on. The second packet may traverse the path of session 40 through each of routers 110. When router 110A receives the second packet, router 110A may inject the calculated path MSS into the second packet. Subsequently, router 110A may forward the second packet to client device 100A. When client device 100A receives the second packet, then client device 100A may receive information indicative of the path MSS for session 40. In turn, client device 100A may control a payload size of one or more packets that client device 100A forwards through the path of session 40 so that the payload size is less than or equal to the path MSS. Routers 110 may inject the path MSS in any message of a communication session protocol (e.g., TCP) used to establish a session.

Client devices 100 may control sizes of TCP packet payloads so that the packet payloads do not exceed a TCP MSS value corresponding to session 40. By controlling packet payload sizes based on a path MSS calculated by router 110A, client devices 100 may reduce a level of in-transit packet segmentation (e.g., fragmentation) as compared with systems that do not control packet payload sizes based on a path MSS. Consequently, client devices 100 may reduce an amount of stream quality problems such as retransmissions and lag that are cause by packet segmentation. Some systems control packet payload sizes based on a path MTU between the two endpoints involved in a TCP session, and tune the network elements involved accordingly. Some example systems allow a user to set an MTU on a network interface in order to control packet payload sizes. By providing information that allows client devices 100 to control packet payload sizes based on a path MTU, router 110A may eliminate a need to control packet payload sizes using the static and error prone techniques of setting an MTU at a user interface.

Figure 2:
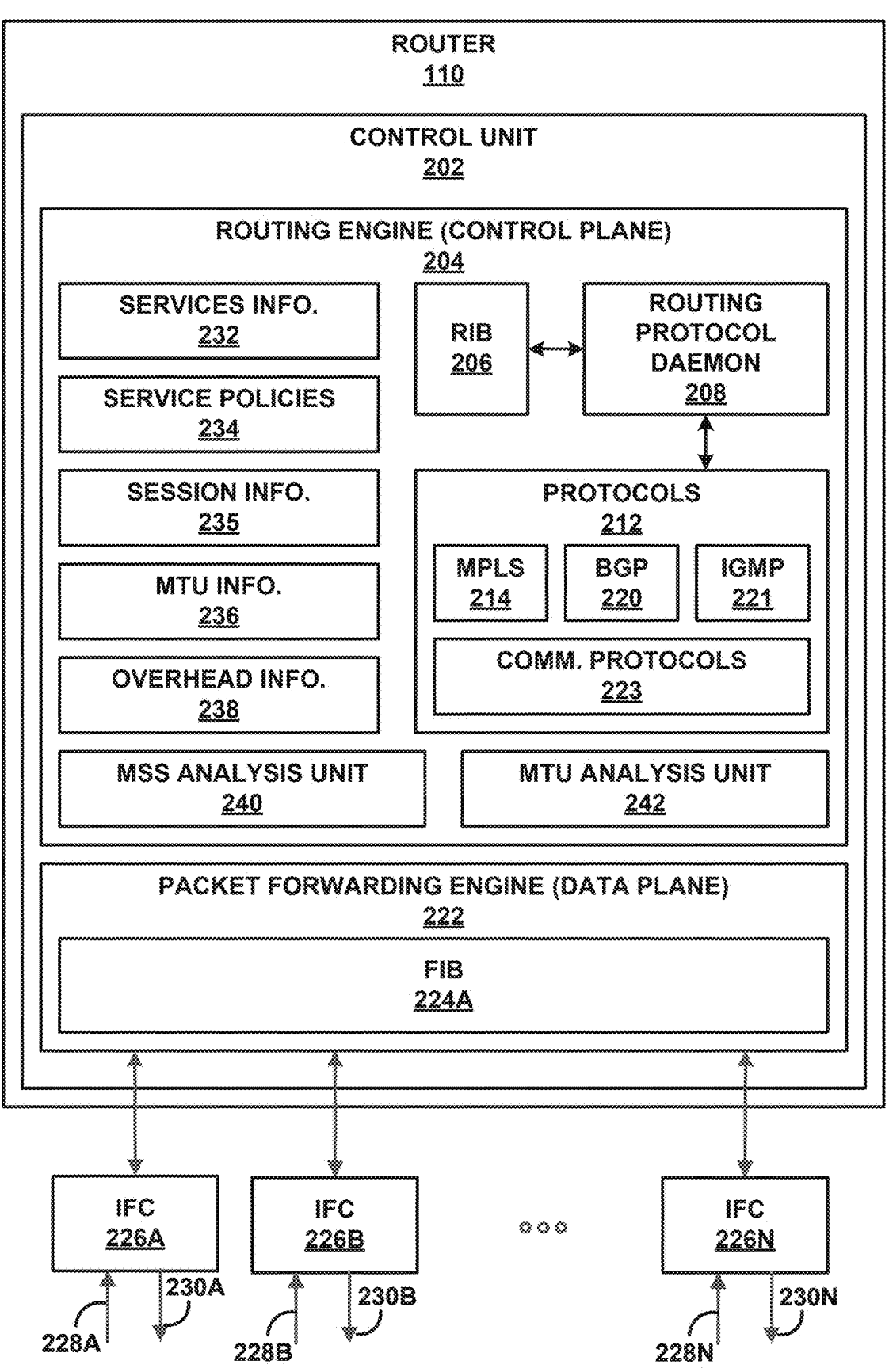
FIG. 2 is a block diagram illustrating an example router, in accordance with one or more techniques of this disclosure.

FIG. 2 is a block diagram illustrating an example router 110, in accordance with one or more techniques of this disclosure. In general, router 110 may be an example of one of routers 110 of FIG. 1. In this example, router 110 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. Router 110 also includes a control unit 202 that determines routes of received packets and forwards the packets accordingly via IFCs 226.

Control unit 202 may comprise routing engine 204 and packet forwarding engine 222. Routing engine 204 operates as the control plane for router 110 and includes an operating system that provides a multi-tasking operating environment for execution of a number of concurrent processes. Routing engine 204 communicates with other routers, e.g., such as routers 110 of FIG. 1, to establish and maintain a computer network, such as computer network system 2 of FIG. 1, for transporting network traffic between one or more customer devices. Routing protocol daemon (RPD) 208 of routing engine 204 executes software instructions to implement one or more control plane networking protocols 212. For example, protocols 212 may include one or more routing protocols, such as Internet Group Management Protocol (IGMP) 221 and/or Border Gateway Protocol (BGP) 220, for exchanging routing information with other routing devices and for updating routing information base (RIB) 206, Multiprotocol Label Switching (MPLS) protocol 214, and other routing protocols. Protocols 212 may further include one or more communication session protocols 223, such as TCP, UDP, TLS, or ICMP.

RIB 206 may describe a topology of the computer network in which router 110 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for packet forwarding engine 222, stored in Forwarding information base (FIB) 224. FIB 224 may associate, for example, network destinations with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

FIB 224 may also include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward flow and/or a reverse flow of the session. As described above, when routing engine 204 receives a packet for a forward packet flow originating from client device 100A and destined for client device 100B of FIG. 1, routing engine 204 determines whether the packet belongs to a new session (e.g., is the "first" packet or "lead" packet of session 40). To determine whether the packet belongs to a new session, routing engine 204 determines whether session information 235 includes an entry corresponding to a source address, source port, destination address, destination port, and protocol of the first packet. If an entry exists, then the session is not a new session. If no entry exists, then the session is new and routing engine 204 generates a session identifier for the session and stores the session identifier in session information 235. Routing engine 204 may thereafter use the session identifier stored in session information 235 for the session to identify subsequent packets as belonging to the same session.

Services information 232 stores information that routing engine 204 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing engine 204 may query services information 232 with one or more of a source address, source port, destination address, destination port, or protocol of a session for a received packet to determine a service associated with a session. For example, routing engine 204 may determine a service identifier based on a correspondence of a source address, source port, destination address, destination port, or protocol in services information 232 to a source address, source port, destination address, destination port, or protocol specified by a session identifier. Routing engine 204 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing engine 204 applies, to the packet, the one or more service policies 234 that correspond to the service associated with the packet.

MTU information 236 stores information indicative of a plurality of path MTUs.

Each path MTU of the plurality of path MTUs may represent a path MTU corresponding to a respective path through two or more routers. For example, the plurality of path MTUs stored by MTU information 236 may include a path MTU corresponding to the path between router 110A and router 110I. The path MTU corresponding to the path between router 110A and router 110I may represent a maximum size (e.g., in bytes) for a packet configured to traverse the path between router 110A and router 110I without segmentation. In some examples, MTU analysis unit 242 is configured to maintain the MTU information 236 by determining one or more path MTUs and updating the MTU information 236 to include the one or more path MTUs. Each path MTU of the one or more path MTUs may represent an entry that includes information indicative of a path MTU value and information indicative of the path corresponding to the respective path MTU value.

In some examples, MTU analysis unit 242 may execute path MTU (PMTU) discovery in order to determine the one or more path MTUs, including the path MTU corresponding to the path of session 40. For example, packet forwarding engine 222 of router 110A may generate a first PMTU discovery packet, where the first PMTUD packet initiates a PMTU discovery technique for determining the path MTU for the path of session 40. The first PMTU discovery packet may include a Don't Fragment (DF) flag in an IP header of the first PMTU discovery packet. MTU analysis unit 242 may determine whether a size of the first PMTU discovery packet is larger than an interface MTU corresponding to an interface between router 110A and router 110B. When the size of the first PMTU discovery packet is not larger than the interface MTU corresponding to the interface between router 110A and router 110B, router 110A may forward the first PMTU discovery packet to router 110B. Subsequently, router 110B may determine whether the size of the first PMTU discovery packet is larger than an interface MTU corresponding to an interface between router 110B and router 110C. When the size of the first PMTU discovery packet is not larger than the interface MTU corresponding to the interface between router 110B and router 110C, router 110B may forward the first PMTU discovery packet to router 110C. This process may continue until the first PMTU discovery packet reaches an interface having an interface MTU that is smaller than a size of the first PMTU discovery packet.

When router 110A determines that a corresponding interface MTU is smaller than a size of the first PMTU discovery packet, router 110A may determine that the size of the first PMTU discovery packet is larger than the interface MTU corresponding to the respective router. For example, the router may send an ICMP Destination Unreachable message. Router 110A may generate a second PMTU discovery packet that has a reduced size equal to the interface MTU corresponding to the respective router of routers 110. The router may forward the second PMTU discovery packet to the next router in the path from router 110A to router 110I. This process may continue until a PMTU discovery packet can traverse the entire path from router 110A to router 110I. When a PMTU discovery packet can traverse the entire path from router 110A to router 110I, router 110A may save the size of the PMTU discovery packet in the MTU information 236 as the path MTU corresponding to the path from router 110A to router 110I.

Although router 110A is described as generating PMTU discovery packets, any one of routers 110 may be configured to generate PMTU discovery packets in order to determine a path MTU corresponding to the path from router 110A to router 110I. In one example, router 110E may generate a PMTU discovery packet and send the PMTU discovery packet to router 110F. In this example, router 110E may determine whether the PMTU discovery packet is larger than an interface MTU corresponding to an interface between router 110E and router 110F. Any one or combination of routers 110 may generate PMTU discovery packets, and determine one or more interface MTUs based on generating and forwarding these PMTU discovery packets.

Overhead information 238 stores information indicative of packet overheads required for each path of a plurality of paths. For example, the overhead information 238 may include information indicative of a size of one or more packet headers for a packet configured to traverse the path between router 110A and router 110I. For example, overhead information 238 may include information indicative of a size of a TCP header (e.g., 20 bytes). Overhead information 238 may additionally, or alternatively, include information indicative of a size of an IP header (e.g., 20 bytes). Overhead information 238 is not limited to the sizes of TCP and IP headers, and may include information indicative of a size of other headers corresponding to one or more other packet protocols including, but are not limited to, Transport Layer Security (TLS), User Datagram Protocol (UDP), Internet Control Message Protocol (ICMP), and others.

Additionally, or alternatively, the overhead information 238 may include information indicative of the size of one or more packet headers or other information corresponding to session security. For example, overhead information 238 may include information indicative of the size of a payload expansion for encryption included in the packet. In some examples, packets are encrypted in 16-byte segments, so a size of an encrypted packet must be a multiple of 16 bytes. A size of the payload expansion for encryption may be adjusted depending on a size of the packet payload body. For example, when a packet payload is 241 bytes, the payload expansion for encryption may be 15 bytes so that a combined size of the packet payload body and the payload expansion for encryption (e.g., 256 bytes) is divisible by 16 bytes. In some examples, a size of the payload expansion for encryption may be within a range from 1 byte to 16 bytes. Additionally, or alternatively, the overhead information 238 may include information indicative of the size of an HMAC digest (e.g., 32 bytes).

MSS analysis unit 240 of routing engine 204 may be configured to determine a path MSS corresponding to the path between router 110A and router 110I. In some examples, to determine the path MSS, the MSS analysis unit 240 is configured to identify a path MTU corresponding to the path between router 110A and router 110I. In some examples, every packet that travels between client device 100A and client device 100B traverses the path between router 110A and router 110I. Consequently, the path MTU corresponding to the path between router 110A and router 110I may represent the path MTU corresponding to the path between client device 100A and client device 100B. In some examples, MSS analysis unit 240 is configured to retrieve the path MTU for the path between router 110A and router 110I from the MTU information 236.

Additionally, or alternatively, MSS analysis unit 240 may identify a maximum packet overhead size corresponding to session 40. In some examples, to identify the maximum packet overhead size, the MSS analysis unit 240 may identify one or more packet headers for packets configured to traverse the path between client device 100A and client device 100B. In some examples, MSS analysis unit 240 may determine that a TCP header and an IP header are needed for sending packets through the path between client device 100A and client device 100B. In some examples, the TCP header and/or the IP header may include any one or combination of the L3 header and the metadata described herein. MSS analysis unit 240 may also identify one or more packet headers or other information relating to a security of the session 40 between client device 100A and client device 100B. For example, packets traveling between any two of routers 110A-110I may include a payload expansion for encryption and/or an HMAC header. MSS analysis unit 240 may calculate a sum of the respective sizes of the one or more packet headers that a packet must include in order to traverse the path between client device 100A and client device 100B. The sum of the respective sizes of the one or more packet headers may represent the maximum packet overhead size corresponding to session 40.

In some examples, to identify the maximum packet overhead size, MSS analysis unit 240 may determine a first packet overhead corresponding to a protocol of a packet configured to traverse the route from the first client device to the second client device over the session. For example, the packet may comprise a TCP packet, and MSS analysis unit 240 may determine one or both of an IP header overhead size (e.g., 20 bytes) and a TCP header overhead size (e.g., 20 bytes). Additionally, or alternatively, MSS analysis unit 240 may determine a second packet overhead corresponding to the session through the one or more routers. The second packet overhead may include one or more headers for security or other session-specific information. For example, session 40 may require one or more security headers (e.g., a payload expansion for encryption and a 32 byte header for a hash-based message authentication code (HMAC) digest). MSS analysis unit 240 may identify the maximum packet overhead size based on the first packet overhead and the second packet overhead. In some examples, MSS analysis unit 240 may calculate the maximum overhead size by calculating a sum of the first packet overhead and the second packet overhead.

MSS analysis unit 240 may calculate a path MSS corresponding to session 40 based on the path MTU corresponding to the path of session 40 and the maximum packet overhead size corresponding to session 40. In some examples, MSS analysis unit 240 may calculate the path MSS for session 40 by subtracting the maximum packet overhead size from the path MTU. Since the path MTU for the path between client device 100A and client device 100B represents a maximum total packet size for a packet configured to traverse the path between client device 100A and client device 100B without segmentation, the path MSS corresponding to session 40 may represent a difference between the path MTU and a maximum packet overhead size for packets configured to traverse the path between client device 100A and client device 100B.

In this way, the path MSS represents a maximum packet payload size for a packet configured to traverse the path between client device 100A and client device 100B without segmentation. A packet having a payload that is larger than the path MSS for session 40 might not be able to traverse the path between client device 100A and client device 100B without segmentation, because a total size of the packet including both of the packet payload and the packet overhead is greater than the path MTU for the path between client device 100A and client device 100B. A packet having a payload that is less than or equal to the path MSS for session 40 may traverse the path between client device 100A and client device 100B without segmentation, because the total size of the packet including both of the packet payload and the packet overhead is less than or equal to the path MTU for the path between client device 100A and client device 100B.

In some examples, MSS analysis unit 240 determines the path MSS for session 40 when router 110 establishes session 40 between client device 100A and client device 100B. For example, packet forwarding engine 222 of router 110A may be configured to receive, from client device 100A, a first packet including a request to establish session 40 between client device 100A and client device 100B. In some examples, the first packet represents a TCP "SYN" packet for establishing a TCP session. The first packet may include a TCP header, an IP header, and a packet payload.

MSS analysis unit 240 may determine, based on receiving the first packet from the client device 100A, a path MSS corresponding to session 40. It may be beneficial for MSS analysis unit 240 to determine the path MSS based on receiving the request to establish session 40, so that client device 100A and client device 100B can limit packet payloads to avoid packet segmentation. As described above, MSS analysis unit 240 may determine the path MTU for the path between client device 100A and client device 100B by retrieving the path MTU from the MTU information 236. MSS analysis unit 240 may also determine the maximum packet overhead size based on the overhead information 238.

In some examples, MSS analysis unit 240 may inject information indicative of the path MSS for session 40 into the first packet. For example, the first packet may include information indicative of an MSS. MSS analysis unit 240 may control packet forwarding engine 222 to forward the first packet through the path of routers 110 to client device 100B. In some examples, when router 110I receives the first packet, the router 110I may forward the first packet to client device 100B.

In some examples, client device 100B may output a second packet to router 110I in response to receiving the first packet from router 110I. In some examples, the second packet represents a TCP "SYN-ACK" packet acknowledging the "SYN" packet.

In some examples, the second packet includes information indicative of the path MSS corresponding to session 40, but this is not required. Client device 100B may generate the second packet to include the path MSS information included in the first packet received by client device 100B. In some examples, the second packet might not include information indicative of the path MSS corresponding to session 40.

Router 110I may forward the second packet through the path of session 40 to Router 110I. Router 110I may, in some examples, inject the second packet with information indicative of the path MSS corresponding to session 40 when the second packet does not include information indicative of the path MSS corresponding to session 40. In some examples, router 110I may forward the second packet to client device 100A. In some cases, when client device 100A receives the second packet, client device 100A may generate a third packet for sending to router 110A. Router 110A may forward the third packet to router 110I, which in turn may forward the third packet to client device 100B. The third packet may represent a TCP "ACK" packet. The TCP ACK packet may represent the final packet in the TCP 3-way handshake process, so when client device 100B receives the third packet, the TCP 3-way handshake process may be completed.

Figure 3A:
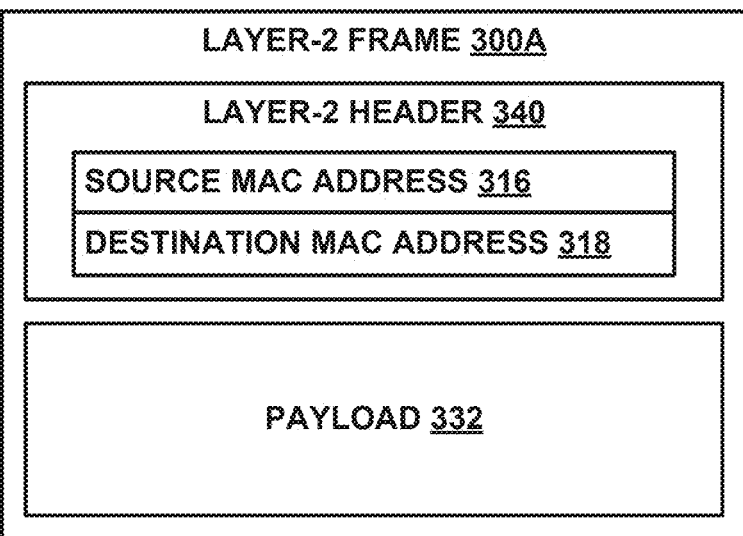
FIG. 3A is a block diagram illustrating a data structure for an L2 frame, in accordance with one or more techniques of this disclosure.

FIG. 3A is a block diagram illustrating a data structure for L2 frame 300A, in accordance with one or more techniques of this disclosure. In some examples, L2 frame 300A comprises an Ethernet frame. L2 frame 300A includes L2 header 340 and data payload 332. L2 header 340 specifies source MAC address 316 indicative of a device originating L2 frame 300A and destination MAC address 318 indicative of a device to which L2 frame 300A is destined. L2 frame 300A may represent an L2 packet configured to traverse an interface between a client device of client devices 100 and a router of routers 110.

In some examples where L2 frame 300A is an Ethernet frame, L2 frame 300A may additionally include a preamble, an EtherType, and a frame check sequence (not depicted in FIG. 3A). In some examples, L2 header 340 includes an IEEE 802.1Q VLAN tag that specifies a VLAN to which L2 frame 300A belongs. In some examples, L2 header 340 includes an IEEE 802.1ad Q-in-Q tag that specifies multiple "stacked" VLANs to which L2 frame 300A belongs.

As described above with reference to FIG. 1, in some examples, router 110A receives L2 frame 300A from client device 100A. In this example, source MAC address 316 specifies a MAC address of client device 100A and destination MAC address 318 specifies client device 100B. Router 110A may obtain the source MAC address 316 and destination MAC address 318 from the L2 frame 300A and generate an L3 packet comprising a first portion of metadata including source MAC address 316 and destination MAC address 318, as further described in FIG. 3B below.

FIG. 3B is a block diagram illustrating a data structure for L3 packet 300B generated from L2 frame 300A, in accordance with one or more techniques of this disclosure. L3 packet 300B includes L3 header 302, metadata 320, and data payload 332. L3 frame 300A may represent an L3 packet configured to traverse an interface between a first router of routers 110 and a second router of routers 110.

L3 header 302 specifies source router IP address 304 indicative of a device originating L3 packet 300B, source port 306 indicative of a port of the originating device from which L3 packet 300B egresses, destination router IP address 308 indicative of a device to which L3 packet 300B is destined, destination port 310 indicative of a port of destination device to which L3 packet 300B is destined, and router IP protocol 312, which specifies a protocol used by L3 packet 300B. In some examples, router IP protocol 312 specifies one of TCP or UDP.

Metadata 320 specifies source client IP address 322, source client port 324, destination client IP address 326, destination client port 328, and client IP protocol 330. Source client IP address 322 and source client port 324 together comprise L3 address information corresponding to source MAC address 316 of the device originating L2 frame 300A. Destination client IP address 326 and destination client port 328 together comprise L3 address information corresponding to destination MAC address 318 of the device to which L2 frame 300A is destined. Client IP protocol 330 specifies a protocol used by source client IP address 322, source client port 324, destination client IP address 326, and destination client port 328. In some examples, client IP protocol 330 specifies one of TCP or UDP.

As described above with reference to FIG. 1, in some examples, router 110A generates L3 packet 300B in response to receiving L2 frame 300A. In this example, source router IP address 304 and source port 306 specify an IP address of router 110A and port used by router 110A to forward L3 packet 300B, respectively. Destination router IP address 308 and destination port 310 specify an IP address and port of router 110B to which L3 packet 300B is destined, respectively.

Additionally, source client IP address 322 and source client port 324 of metadata 320 specify L3 address information corresponding to the MAC address of client device 100A. Destination client IP address 326 and destination client port 328 of metadata 320 specify L3 address information corresponding to the MAC address of client device 100B. As described above, routers 110 of FIG. 1 may use metadata 320 as a session identifier to identify a session associated with L2 frame 300A and/or L3 packet 300B so as to perform session-based routing of L2 frame 300A and/or L3 packet 300B.

Figure 4:
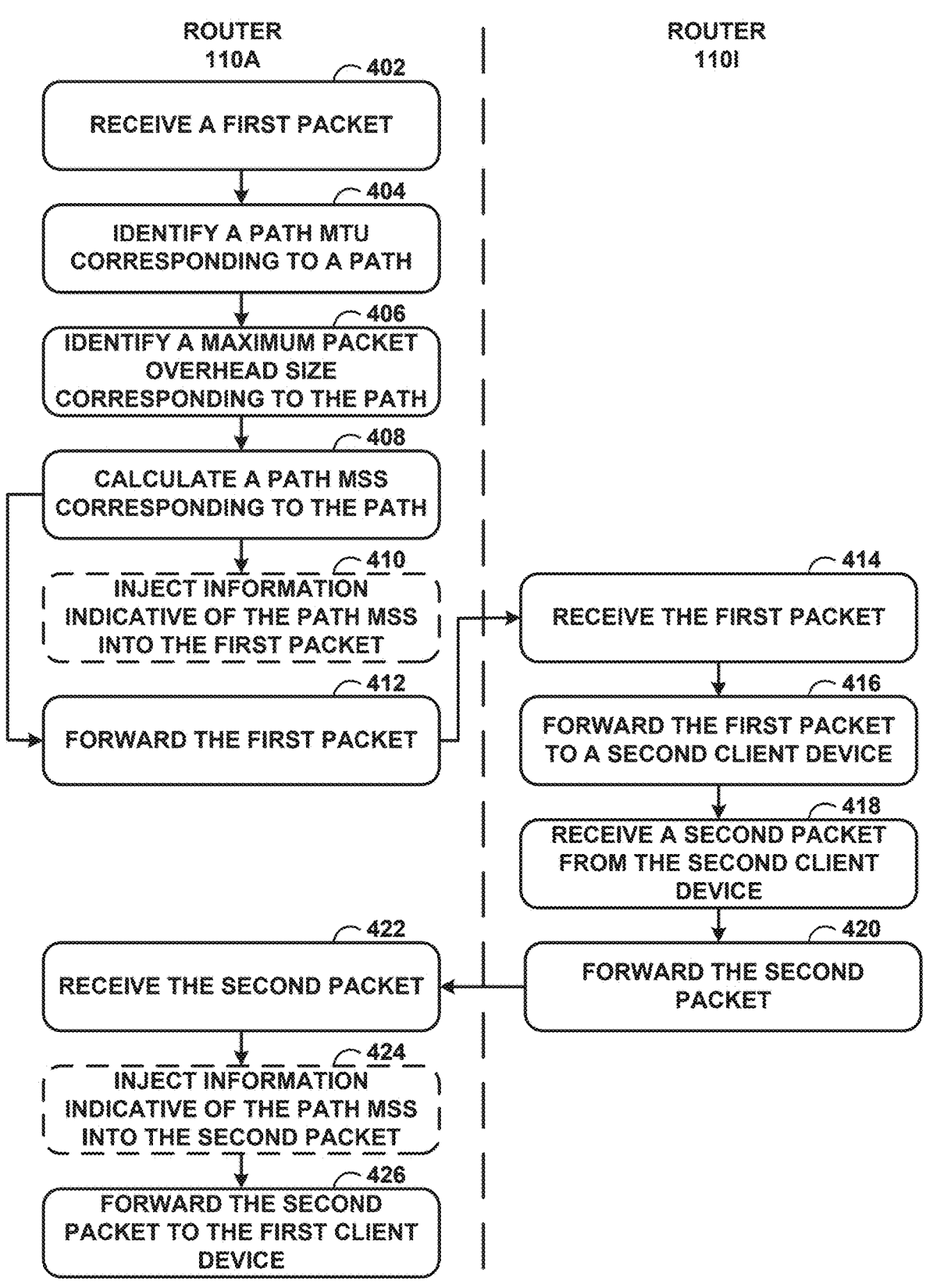
FIG. 4 is a flow diagram illustrating an example operation for determining a path MSS corresponding to a session and outputting information indicative of the path MSS to one or more client devices, in accordance with one or more techniques of this disclosure.

FIG. 4 is a flow diagram illustrating an example operation for determining a path MSS corresponding to a session and outputting information indicative of the path MSS to one or more client devices, in accordance with one or more techniques of this disclosure. For convenience, FIG. 4 is described with respect to client devices 100 and routers 110 of FIGS. 1-2. However, the techniques of FIG. 4 may be performed by different components of client devices 100 and routers 110 or by additional or alternative devices.

Router 110A may receive a first packet indicating a path between router 110A and router 110I (402). In some examples, the packet may include one or more packet headers that indicate a source device (e.g., client device 100A) and a destination device (e.g., client device 100B. In some examples, each packet that travels between client device 100A and client device 100B travels across the same path through routers 110. That is, a packet traveling from client device 100A to client device 100B may travel through routers 110 from router 110A to router 110I, and a packet traveling from client device 100B to client device 100A may travel through routers 110 from router 110I to router 110A. Consequently, the information indicating the source device and the destination device may indicate the path between router 110A and router 110I.

Router 110A may identify a path MTU corresponding to the identified path between router 110A and router 110I (404). In some examples, router 110A may look up the path MTU in MTU information 236. MTU information 236 may include a plurality of path MTUs each corresponding to a respective path. The path MTU corresponding to the path between router 110A and router 110I may represent a maximum size for a packet configured to traverse the path between router 110A and router 110I without segmentation. Router 110A may identify a maximum packet overhead size corresponding to the path between router 110A and router 110I (406). In some examples, router 110A may look up the maximum packet overhead size from the overhead information 238. The overhead information 238 may include information indicative of a size of one or more packet headers required for packets that traverse the path between router 110A and router 110I.

Router 110A may calculate a path MSS corresponding to the identified path between router 110A and router 110I (408). In some examples, router 110A may calculate the path MSS by calculating a difference between the path MTU and the maximum packet overhead size corresponding to the path between router 110A and router 110I. Since the maximum packet overhead size represents the maximum size of on overhead of a packet that traverses the path, the path MSS represents a maximum payload size of a packet that traverses the path without exceeding the path MTU.

In some examples, router 110A may inject information indicative of the path MSS into the first packet (410), but this is not required. When router 110A injects information indicative of the path MSS into the first packet, then the information indicative of the path MSS may propagate to each device that receives the first packet after router 110A forwards the first packet. Router 110A may forward the first packet (412) through the path including routers 110A-110I. Router 110I may receive the first packet (414) and forward the first packet to client device 100B (416). In some examples, router 110I may receive a first packet from router 110H, and router 110I forward the first packet to client device 100B. Router 110I may receive a second packet from client device 100B (418), and forward the second packet through the path including routers 110 (420).

Router 110A may receive the second packet (422) forwarded through the path including routers 110. In some examples, router 110A may inject information indicative of the path MSS into the second packet (424), but this is not required. Router 110A may forward the second packet to client device 100A (426). When router 110A injects information indicative of the path MSS into the first packet and the second packet, then both of the client device 100A and client device 100B may receive the information indicative of the path MSS. Consequently, client device 100A and client device 100B may control a payload size of all packets forwarded over the path between router 110A and router 110I so that the packet payload size does not exceed the path MSS. By controlling the packet payload sizes so that packet payload sizes do not exceed the path MSS, router 110A may decrease or completely eliminate packet segmentation over session 40 as compared with routers that do not output information indicative of the path MSS. In some examples, client devices 100 may control packet payload sizes to be equal to the path MSS for session 40, thus decreasing a total number of packets required to transmit data over session 40.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A first router comprising:
processing circuitry; and
one or more memories storing instructions that when executed configure the processing circuitry to:

receive, from a first client device, a first data packet destined for a second client device;

modify the first data packet by expanding a packet overhead size of the first data packet to generate a modified first data packet;

inject first information including a path maximum segment size (MSS) into the modified first data packet received from the first client device, wherein the path MSS is based on a maximum packet payload size corresponding to the expanded packet overhead size of the modified first data packet to traverse a path between the first router and a second router; and forward the modified first data packet through a set of routers to the second router to inform the second client device of the path MSS;

receive, from the second router in response to forwarding the modified first data packet, a second data packet originating from the second client device and destined for the first client device;

inject second information including the path MSS into the second data packet; and forward the second data packet to the first client device to inform the first client device of the path MSS.

2. The first router of claim 1, wherein the first data packet includes a request to establish a session between the first client device and the second client device.

3. The first router of claim 1, wherein the processing circuitry is further configured to:
identify a path maximum transmission unit (MTU) corresponding to the path between the first router and the second router; and
calculate the path MSS based on the path MTU.

4. The first router of claim 3, wherein to identify the path MTU corresponding to the path between the first router and the second router, the processing circuitry is configured to identify a minimum of an ingress MTU and an egress MTU, wherein the ingress MTU corresponds to an ingress interface of the first router, and wherein the egress MTU corresponds to an egress interface of the first router.

5. The first router of claim 3, wherein the processing circuitry is further configured to:
generate a first path MTU discovery packet, and
determine whether a size of the first path MTU discovery packet is larger than an interface MTU corresponding to an interface between the first router and a third router of the set of routers, wherein the third router represents a next hop from the first router in the path from the first router to the second router; and
identify the path MTU based on whether the size of the first path MTU discovery packet is larger than the interface MTU.

6. The first router of claim 5, wherein based on determining that the size of the first path MTU discovery packet is larger than the interface MTU, the processing circuitry is configured to:
output, to the first client device, a message indicating that the size of the first path MTU discovery packet is larger than the interface MTU;
generate a second path MTU discovery packet, wherein a size of the second path MTU discovery packet is less than or equal to the interface MTU; and
determine whether the second path MTU discovery packet can traverse the path between the first router and the second router.

7. The first router of claim 3, wherein the processing circuitry is further configured to:

identify a maximum packet overhead size corresponding to a session between the first client device and the second client device over the path between the first router and the second router, wherein the first client device is connected to the first router, and wherein the second client device is connected to the second router; and calculate, based on the path MTU and the maximum packet overhead size, the path MSS.

8. The first router of claim 7, wherein to calculate the path MSS, the processing circuitry is configured to subtract the maximum packet overhead size from the path MTU.

9. The first router of claim 7, wherein to identify the maximum packet overhead size, the processing circuitry is configured to:

determine a first packet overhead corresponding to a protocol of a packet configured to traverse the path from the first router to the second router over the session;

determine a second packet overhead corresponding to the session; and identify the maximum packet overhead size based on the first packet overhead and the second packet overhead.

10. The first router of claim 9, wherein the protocol includes transmission control protocol (TCP) and Internet protocol (IP), and wherein the first packet overhead is based on a size of a TCP packet header and an IP packet header.

11. The first router of claim 9, wherein the session comprises a secure session, wherein the second packet overhead includes encryption overhead and hash-based message authentication code (HMAC) overhead.

12. The first router of claim 1, wherein the first router comprises an ingress router of the set of routers, wherein the second router comprises an egress router of the set of routers, wherein the set of routers form a chain of routers from the ingress router to the egress router, wherein the first client device communicates with the ingress router, and wherein the second client device communicates with the egress router.

13. A method comprising:

receiving, by processing circuitry of a first router from a first client device, a first data packet destined for a second client device;

modifying, by the processing circuitry, the first data packet by expanding a packet overhead size of the first data packet to generate a modified first data packet;

injecting, by the processing circuitry, first information including a path maximum segment size (MSS) into the modified first data packet received from the first client device, wherein the path MSS is based on a maximum packet payload size corresponding to the expanded packet overhead size of the modified first data packet to traverse a path between the first router and a second router; and forwarding, by the processing circuitry, the modified first data packet through a set of routers to the second router to inform the second client device of the path MSS;

receiving, by the processing circuitry from the second router in response to forwarding the modified first data packet, a second data packet originating from the second client device and destined for the first client device;

injecting, by the processing circuitry, second information including the path MSS into the second data packet; and

forwarding, by the processing circuitry, the second data packet to the first client device to inform the first client device of the path MSS.

14. The method of claim 13, wherein the first data packet includes a request to establish a session between the first client device and the second client device.

15. The method of claim 13, further comprising:

identifying, by the processing circuitry, a path maximum transmission unit (MTU) corresponding to the path between the first router and the second router; and calculating, by the processing circuitry, the path MSS based on the path MTU.

16. The method of claim 15, wherein identifying the path MTU corresponding to the path between the first router and the second router comprises identifying, by the processing circuitry, a minimum of an ingress MTU and an egress MTU, wherein the ingress MTU corresponds to an ingress interface of the first router, and wherein the egress MTU corresponds to an egress interface of the first router.

17. The method of claim 15, wherein the method further comprises:

identifying, by the processing circuitry, a maximum packet overhead size corresponding to a session between the first client device and the second client device over the path between the first router and the second router, wherein the first client device is connected to the first router, and wherein the second client device is connected to the second router; and calculating, by the processing circuitry based on the path MTU and the maximum packet overhead size, the path MSS.

18. The method of claim 17, wherein calculating the path MSS comprises subtracting, by the processing circuitry, the maximum packet overhead size from the path MTU.

19. The method of claim 13, wherein the first router comprises an ingress router of the set of routers, wherein the second router comprises an egress router of the set of routers, wherein the set of routers form a chain of routers from the ingress router to the egress router, wherein the first client device communicates with the ingress router, and wherein the second client device communicates with the egress router.

20. Non-transitory computer-readable media comprising instructions that, when executed by processing circuitry of a first router, causes the processing circuitry to:

receive, from a first client device, a first data packet destined for a second client device;

modify the first data packet by expanding a packet overhead size of the first data packet to generate a modified first data packet;

inject first information including a path maximum segment size (MSS) into the modified first data packet received from the first client device, wherein the path MSS is based on a maximum packet payload size corresponding to the expanded packet overhead size of the modified first data packet to traverse a path between the first router and a second router;

forward the modified first data packet through a set of routers to the second router to inform the second client device of the path MSS;

receive, from the second router in response to forwarding the modified first data packet, a second data packet originating from the second client device and destined for the first client device;

inject second information including the path MSS into the second data packet; and forward the second data packet to the first client device to inform the first client device of the path MSS.

* * * * *